March 20, 1962

J. F. NAMETH ET AL 3,026,517

RADAR SCANNING SYSTEM

Filed May 9, 1955

JAMES F. NAMETH
ROMAR E. STEIN
INVENTORS

BY

ATTORNEY

JAMES F. NAMETH
ROMAR E. STEIN
INVENTORS

BY
ATTORNEY

March 20, 1962     J. F. NAMETH ET AL     3,026,517
RADAR SCANNING SYSTEM Filed May 9, 1955

JAMES F. NAMETH
ROMAR E. STEIN
INVENTORS

BY
ATTORNEY

United States Patent Office 3,026,517
Patented Mar. 20, 1962

3,026,517
RADAR SCANNING SYSTEM
James F. Nameth, Downey, and Romar E. Stein, Los Angeles, Calif., assignors to Gilfillan Bros. Inc., Los Angeles, Calif., a corporation of California
Filed May 9, 1955, Ser. No. 506,696
27 Claims. (Cl. 343—758)

This invention relates to a radar system having one or more beam-radiating reflectors or antennas together with associated components for producing visual displays of target information, including surveillance displays covering relatively wide ranges of angles such as plan-position-indicator (PPI) displays and also including precision displays covering relatively narrow angles.

In general the invention is directed to the problem of actuating and controlling the beam-radiating antenna or antennas of such a system from a remote indicator station, the object being to achieve effective scanning operation under highly flexible control to meet the changing requirements for locating and tracking targets moving at relatively high velocities in changing directions.

While the underlying concepts of the invention are applicable to various scanning systems involving selection among target displays of different angular extent, it has special utility in ground controlled approach (G.C.A.) aircraft landing systems. Such an embodiment of the invention has been selected for the present disclosure and will provide adequate guidance for those skilled in the art who may have occasion to apply the same principles to other specific purposes.

Surveillance or search scanning in the operation of a system of the present type is accomplished by continuous rotation of an azimuth beam-radiating reflector or antenna to produce a plan-position-indicator (PPI) display and, when desired, precision scanning for more accurate target information is accomplished by oscillation of the azimuth reflector through a relatively narrow angle in the general direction of a particular target to produce what is termed a precision display. This precision display may be in rectilinear coordinates. One object of the invention, therefore, is to provide means for mounting, actuating and controlling such a beam-radiating antenna that will permit rapid shift at will between operation for surveillance scanning and operation for precision scanning and will also permit rapid change in the orientation or general direction of the precision scanning.

Preferably rapid shift between the two scanning operations is provided by using two separate actuating means for the two operations in combination with control means for making the two actuating means effective selectively; and control in the direction of the precision scanning is provided by mounting the rotary antenna and its two driving means on a support structure that is rotatable by a third actuating means. Such an arrangement simplifies the problem of actuation and control since the second actuating means may simply oscillate the azimuth antenna through an angle that is fixed relative to the support structure, the orientation of the angle being controlled by rotation of the support structure. The two alternate actuators or drivers may be made effective selectively, for example, by using corresponding clutches under appropriate centralized control.

The rapid shift between the two modes of operation of the antenna involves certain problems arising from the inertia of the antenna together with associated moving parts and it is a further object of the invention to meet these problems. The problem in shifting from oscillation of the antenna to continuous rotation is not troublesome and may be met, if necessary, by using a friction clutch that will permit momentary starting slippage. The problem of changing from continuous rotation to oscillation within a predetermined narrow angle is more difficult, however, because the change should be accomplished within one revolution of the antenna to avoid loss of time and within such a single revolution the rotating antenna must be decelerated to the sector scan speed.

One feature of the present practice of the invention is the concept of providing means to insure that the oscillating actuating driver will always be at a starting position to favor minimum shock loads in the transition from surveillance to precision scanning. Thus the starting position may be at that limit portion of the two limit portions of oscillatory movement from which the initial movement of oscillation will be in the same rotary direction as the surveillance rotation of the antenna. A second feature is the provision of a yielding connection between the antenna and the oscillating driver to serve as a shock absorber. Preferably the yielding connection is in the form of a spring and the spring is combined with a dash-pot to oppose the restoration movement of the spring.

In the present practice of the invention, a second elevation beam-radiating antenna is mounted on the same rotary support as the first antenna for actuation vertically. This second antenna is preferably positioned approximately radially edgewise of the axis of rotation of the azimuth antenna and is movable in a vertical plane of rotation about a second scanning axis. The elevation antenna is idle during search scanning operation by the azimuth antenna but during precision scanning it is oscillated concurrently with the azimuth antenna. The precision display which combines azimuth and elevation display is referred to as AZ-EL display and either may be in rectilinear coordinates of range and angle in the form of a "B" display or may be in a combination of rectilinear and polar coordinates as set forth in the Tasker et al. Patent 2,649,581.

For precision scanning the two antennas are oscillated concurrently but at 90 degrees out of phase with each other and a feature of the invention in this respect is actuation of both of the antennas by a simple driver in the form of a crank means or the equivalent. This drive crank is suitably linked to a first driven crank or the equivalent for actuating the azimuth antenna and is also linked to a second driven crank or the equivalent for actuating the elevation antenna. The desired 90 degrees phase relationship is accomplished simply by placing the two cranks at locations 90 degrees apart radially of the axis of rotation of the drive crank.

A further object of the invention is to add certain useful refinements to this preferred arrangement of two antennas and two drivers on a single rotary support structure. One refinement is provision for oscillation of the elevation antenna selectively either through a relatively small angle for normal precision scanning or through a relatively large angle that is especially useful for ascertaining the height of aerial targets. Another refinement is provision for varying the angle of the azimuth antenna relative to its plane of rotation so that the azimuth antenna may be tilted downward to include more terrain in the display or may be tilted upward to include more of the sky. Still another refinement is provision for varying the angle of the elevation reflector relative to its plane of rotation so that it may be inclined to the left or to the right relative to the general direction of the angle of oscillation of the azimuth antenna in precision scanning. This capability for lateral inclination of the elevation reflector is convenient, for example, in covering runways to the left and right of the antenna installation.

It is also an object of the invention to provide a system for adequate correlation between a dual antenna or unit of the character described and an associated indicator station at any desired distance from the antenna unit. It is contemplated that the dual antenna unit will be under remote control from the indicator station and suitable mechanical and electrical means are provided to make the antenna unit operatively responsive to the indicator station for creating the desired visual displays in response to the operation of the antenna unit. Thus two-way communication is required between the antenna unit and the indicator station.

In one embodiment of the invention, for example, the following signals are sent from the indicator station to the antenna unit:

(1) A control signal to tilt the azimuth antenna upward.

(2) A control signal to tilt the azimuth antenna downward.

(3) A control signal to energize a servo to incline the elevation antenna leftward.

(4) A control signal to energize a servo to incline the elevation antenna rightward.

(5) A control signal to rotate the mount or rotary support structure for the two antennas clockwise.

(6) A control signal to rotate the mount or rotary support structure of the two antennas counter-clockwise.

(7) A control signal for surveillance scanning operation and alternately for precision or "final approach" scanning in the landing of an aircraft.

(8) A control signal for height finder operation which differs from final approach operation by the oscillation of the elevation antenna through a larger arc.

On the other hand, the following signals are generated by the antenna unit for the benefit of the indicator station:

(1) A strobe gate signal created at a given point in the surveillance rotation of the azimuth antenna.

(2) An unblanking signal created at two given points in the oscillation of the azimuth antenna during precision scanning.

(3) An AZ-EL relay signal.

(4) An unblanking signal created at two given points in the oscillation of the elevation antenna during precision scanning.

(5) An azimuth synchro signal representing the changing angular position of the azimuth antenna.

(6) Two elevational synchro signals representing the changing angular position of the elevation antenna for normal and extended scanning arcs, respectively.

(The signals 5 and 6 are converted by a mixer into an AZ-EL angle data signal. This mixer may be either at the antenna unit or at the remote indicator station. If the mixer is at the antenna unit, the AZ-EL angle data signal from the mixer will be sent to the indicator station over two separate leads.)

(7) A synchro signal derived from rotation of the azimuth antenna on the rotary support structure and corrected to compensate for changes in orientation of the rotary support structure. This signal governs the orientation of the surveillance display.

(8) A signal indicating the tilt of the azimuth antenna relative to its horizontal plane of rotation.

(9) A signal indicating the lateral inclination of the elevation antenna relative to its vertical plane of rotation.

Further specific objects of the invention relate to provisions for generating these two sets of signals for the required two-way communication between the antenna unit and the indicator station.

The various objects, features and advantages of the invention may be understood by reference to the following detailed description of the presently preferred embodiment of the invention, considered with the accompanying drawings.

In the drawings, which are to be regarded as merely illustrative.

*General Arrangement*

Figure 1:
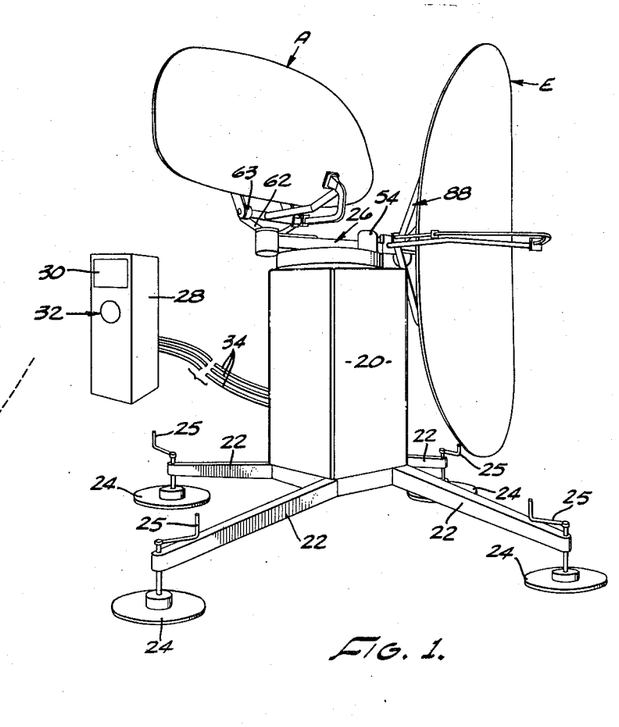
FIG. 1 is a perspective view of the dual antenna unit together with a remote indicator station.

FIG. 1 shows an antenna unit having an upright housing 20 mounted on four laterally extending legs 22. For convenient leveling of the unit each of the four legs is supported by an adjustable foot pad 24 that may be varied vertically by an adjustment crank 25 in a well known manner. Mounted on top of the housing 20 is a rotary support structure in the form of a transverse beam 26 which carries a rotary azimuth beam-radiating antenna, generally designated A and a rotary elevation beam-radiating antenna, generally designated E.

Associated with the antenna unit is a remote indicator station represented by an upright cabinet 28. The cabinet has a control panel 30 and the usual display device in the form of a cathode ray tube or "scope" 32. Two-way communication between the antenna unit and the indicator station 28 is provided by a plurality of conductors in cables 34.

Figure 2:
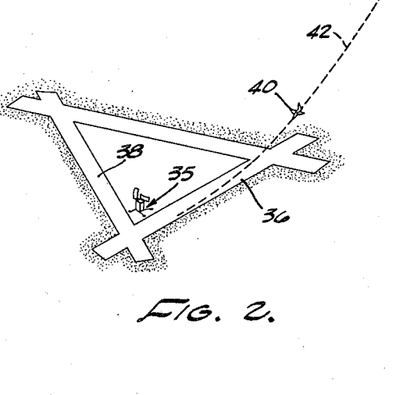
FIG. 2 is a diagrammatic perspective view showing how the antenna unit may be positioned adjacent the runways of a landing field.

In a typical G.C.A. system the antenna unit is installed on the landing field adjacent one or more runways. Thus FIG. 2 shows an antenna unit 35 of the present type mounted near the intersection of two runways 36 and 38 for use in conjunction with the two runways selectively. FIG. 2 shows an aircraft 40 making a landing by following a desired glide path 42 that is determined by the operation of the antenna unit in cooperation with the indicator station.

Figure 3:
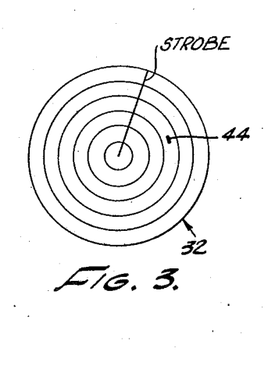
FIG. 3 is a face view of a typical surveillance display.

In surveillance or search scanning used for initially locating a target on the horizon, the azimuth antenna rotates in a continuous manner about its vertical scanning axis and the indicator station 30 produces a corresponding PPI display at the scope 32. FIG. 3 shows such a polar display with a target indicated thereon by a bright spot 44. In addition to the polar display of FIG. 3, there is also shown a strobe line which identifies the center line of the precision scanning position for the antenna system. In the general operation of the system, an aircraft indicated by bright spot 44 is guided, during the wide angle or search scanning phase, to the vicinity of the strobe line.

After the operator at indicator station 28 notices that the aircraft is within the precision narrow angle scanning area, he switches the operation of the unit over to precision scanning. This, then, terminates the search rotational operation of the azimuth antenna and initiates the phase wherein the azimuth and elevation antennas are operated concurrently in their respective precision angles.

It will be shown in the specific description which follows that the invention makes it possible to reorient the antenna system so as to vary the position of the narrow angle precision scanning area. This is done, according to the invention, without changing the absolute coordinates of the PPI display so that rotation of the antenna unit about its mount causes the strobe line of FIG. 3 to move to continuously represent the narrow angle scan position. Accordingly, it is possible to reorient the system to control landing on different runway sites and, therefore, in some cases, it may be possible to bring an aircraft within the precision scanning angle by rotation of the antenna unit during the search phase until the strobe line reaches the vicinity of bright spot 44 representing the aircraft.

The particular circuit means for generating a signal representing the strobe line shown in FIG. 3 are not described herein since they form no part of the present invention. Reference may be made, however, for further information respecting this technique to copending U.S. patent application Serial No. 502,047, filed April 18, 1955, by Lawrence Michels for "Selectively Operable Strobe Marking Circuit," now Patent No. 2,962,709.

Figure 4:
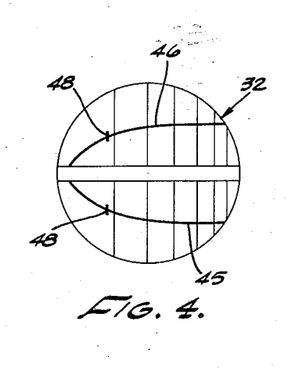
FIG. 4 is a face view of a typical AZ-EL display.

In precision scanning the azimuth antenna A oscillates through a relatively narrow angle that includes the direction or bearing of the approaching aircraft and concurrently the elevation antenna E oscillates in its vertical plane of rotation to scan in the same general direction. The visual display at the scope 32 is changed to a "B" pattern as shown in FIG. 4. A "B" display is a rectilinear display wherein the range coordinate remains fixed along one axis and the angle coordinate is linearly variable along a second coordinate perpendicular to the first. The lower half of FIG. 4 which is derived from operation of the azimuth antenna is an azimuth display with the desired glide path 42 indicated in plan by a cursor line 45; the upper half, which is derived from operation of the elevation antenna, indicates the same glide path in elevation by a cursor line 46. In each of these halves of the composite display a bright spot 48 indicates the position of the approaching aircraft relative to the desired glide path.

*Mounting Structure for the Two Antennas*

Figure 5:
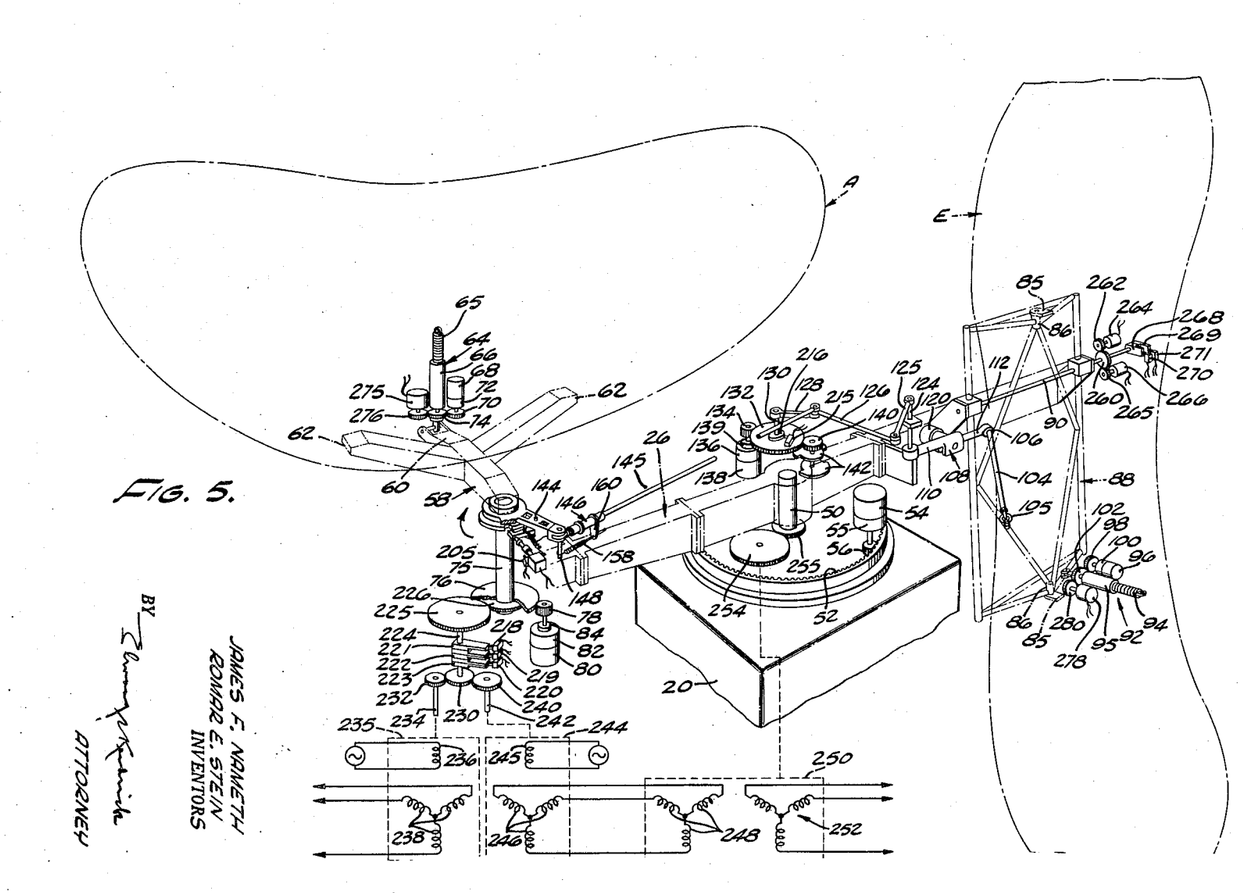
FIG. 5 is a simplified perspective view, partly diagrammatic, of the rotary support structure with the two antennas mounted thereon.

The support beam 26, which is shown in phantom in FIG. 5, is rotatably mounted on a fixed spindle 50 which is positioned concentrically of a fixed ring gear 52. The means for rotating the support beam 26 for different orientations of precision scanning by the two antennas thereon may comprise a suitable motor 54 carried by the beam. The motor 54 acting through reduction gearing in a gear case 55 actuates a pinion 56 that is in mesh with the ring gear 52. Preferably the range of rotation of the support beam 26 is limited to approximately one revolution to avoid the necessity of employing slip rings in the associated electrical circuits. The azimuth antenna may be mounted on a suitable yoke 58 having a longitudinal extension 60 and a pair of lateral arms 62. The azimuth antenna is journalled in suitable bearings 63 (FIG. 1) at the ends of the yoke arms 62 for tilt adjustment about a horizontal axis and such adjustment is accomplished by means of a variably extensible link 64.

The variable link 64, which is connected at one end to the yoke extension 60 and is connected at the other end to the back of the azimuth antenna, is made in two sections. One section is a screw member 65 that is fixed against rotation and the other section is a tubular member 66 in threaded engagement therewith, this screw member being connected to the yoke extenson 60 in a rotatable manner. A suitable reversible motor 68 drives a pinion 70 through reduction gearing in a gear case 72 and the pinion 70 meshes with a second pinion 74 that is unitary with the rotary tubular member 66. Preferably the range of tilt adjustment of the azimuth antenna extends from 2½ degrees below the horizon to 25 degrees above the horizon.

The yoke 58 carrying the azimuth antenna is mounted on an upright suitably journalled tubular shaft 75 which carries a gear 76 in mesh with a pinion 78. What may be termed a first actuating means or driver in the form of a motor 80 actuates the pinion 78 through reduction gearing in a gear case 82, the reduction gearing being operatively connected to the pinion by means of a suitable clutch 84. The clutch 84 is disengaged when the motor 80 is deenergized and is adapted for engagement in response to energization of the motor. Thus deenergization of the motor 80 leaves the tubular shaft 75 and the azimuth antenna free to rotate.

The elevation antenna E is provided with a pair of spaced rearwardly extending ears 85 by means of which it is rotatably mounted on corresponding trunnions 86 of a framework 88 of tubular members. The framework 88 is journalled in suitable bearings (not shown) on the rotary support beam 26, the framework including a transverse axis rod 90 to provide trunnions for this purpose. Thus the elevation antenna is rotatable about the axis of the rod 90, which may be termed the second scanning axis, and at the same time the antenna is rotatable relative to the framework 88 for lateral inclination relative to its vertical plane of rotation. The range of lateral inclination of the elevation antenna may be on the order of 15 degrees in each direction from its plane of rotation.

Lateral inclination adjustment of the elevation antenna may be accomplished by means of a variably extensible link 92. This link may comprise a screw member 94 that is non-rotatably attached to the elevation antenna together with a tubular member 95 in threaded engagement therewith, the tubular member being rotatably connected to the framework 88. A suitable reversible motor 96 drives a pinion 98 through reduction gearing in a gear case 100 and the pinion 98 is in mesh with a second pinion 102 that is unitary with the tubular member 95.

*Means to Drive the Two Antennas for Precision Scanning*

The oscillation of the elevation antenna about its horizontal scanning axis is accomplished by an actuating link 104, one end of which is connected by a universal joint 105 with the framework 88. The other end of the actuating link 104 is connected by a universal joint 106 (FIG. 6) to an actuating rocker arm 108 that is variable in its effective length. In the present construction, for example, the rocker arm 108 is of folding construction.

Figure 6:
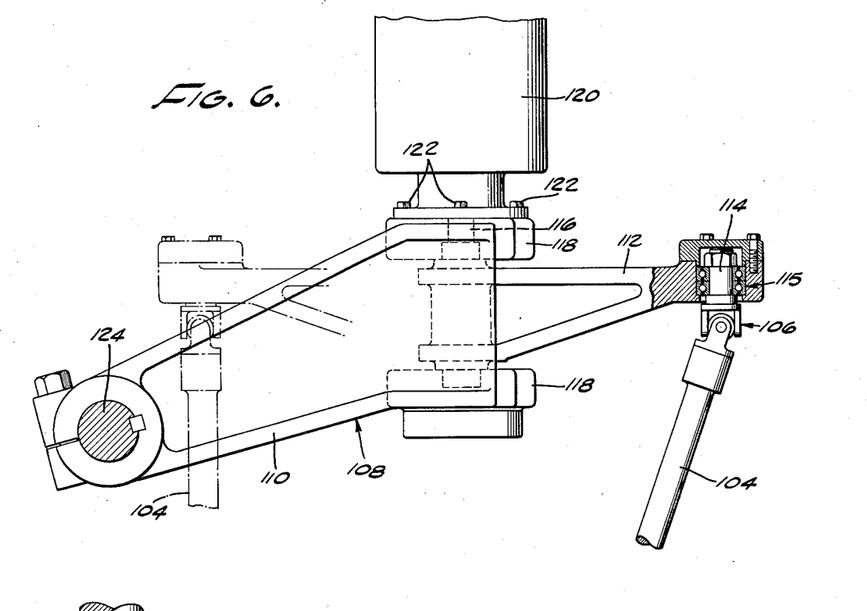
FIG. 6 is a plan view, partly broken away, showing a power-actuated extensible arm that is included in the structure shown in FIG. 5.
Figure 7:
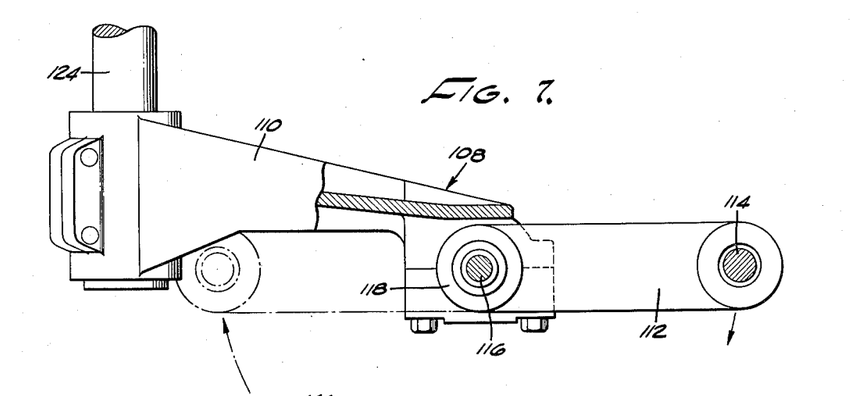
FIG. 7 is a side elevation, partly broken away, of the same extensible arm.

As best shown in FIGS. 6 and 7 the rocker arm 108 is made in two sections comprising a main arm section 110 and an end section 112 that is hingedly mounted on the main arm section to swing between the extended position shown in solid lines in FIG. 7 and the contracted position shown in broken lines. To permit the actuating link 104 to follow this folding movement, the universal joint 106 connects the actuating link with a suitable pin 114 that is retained and journalled by a suitable anti-friction bearing 115 in the foldable end section 112. The end section 112 of the rocker arm is fixedly mounted on a shaft 116 that is journalled in spaced bearings 118 on the inner main arm section 110. This shaft 116 is actuated by a suitable reversible motor 120 that is mounted on the side of the main arm section 112 by suitable screws 122. Suitable limit switches (not shown) deenergize the motor at each of the two limit positions of the end section 112. Thus the rocker arm 108 has two effective lengths that may be selected quickly by operation of the motor 120.

When the motor 120 is energized to shorten the effective length of the rocker arm 108 by folding the end section 112 the range of vertical oscillation of the elevation antenna is 7 degrees, this range extending from 1 degree below the horizfion to 6 degrees above the horizon. When the effective length of the rocker arm is increased by unfolding the end section 112 for greater throw of the outer end of the rocker arm, the range of vertical oscillation of the elevation antenna is increased to extend from 1 degree below the horizon to 30 degrees above the horizon.

The rocker arm 108 is mounted on a suitable journalled vertical rocker shaft 124 on which is mounted a driven rocker arm 125. This driven rocker arm 125 is connected by a link 126 with a drive crank 128 that is carried by a suitably journalled vertical drive shaft 130. The drive shaft 130 carries a gear 132 to permit the drive shaft to be driven by a pinion 134. The pinion 134 is connected with reduction gearing in a gear case 136. The reduction gearing is driven by a motor 138 which may be quickly stopped by a suitable automatic brake 139. The brake 139 is electrically controlled but is spring actuated. In the construction shown, the gear 132 also meshes with a second pinion 140 to rotate a pair of chopper blades 142 that intercept a wave guide (not shown) to alternate the periods of energization of the two antennas in a well known manner.

The drive crank 128 is also connected to a driven rocker arm 144 by a link or operating rod 145 for oscillation of the azimuth antenna in precision scanning. Preferably the link 145 is yieldingly connected to the driven rocker arm 144. For this purpose the link 145 has a dash-pot cylinder 146 fixedly mounted on its end and the driven rocker arm 144 is pivotally connected by a pin 148 with a piston rod 150 (FIG. 8) that terminates in a suitable piston 152 inside the cylinder. The piston 152 has a main passage 154 therethrough controlled by a check valve 155 and also has a bleeder passage 156 to bypass the check valve. A suitable coiled spring 158 is connected at one end to the pivot pin 148 and is connected at the other end to a short arm 160 extending rigidly downward from the dash-pot cylinder 146.

Figure 8:
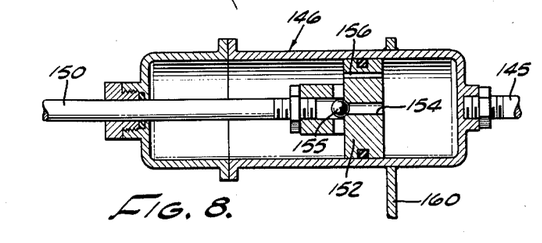
FIG. 8 is a fragmentary sectional view showing the construction of a dash-pot employed in the preferred practice of the invention.

It is apparent that the link 145 is free to increase in length under tension loads against the yielding resistance of the coiled spring 158. The check valve 155 in the dash-pot piston 152 opens to permit this extension of the link 145 but closes to retard the subsequent contraction of the link to a rate governed by the rate of fluid flow through the bleeder passage 156. Thus the link 145 increases in length rapidly in response to a peak tension load and then is restored gradually to its normal contracted length.

Figures 9, 10:
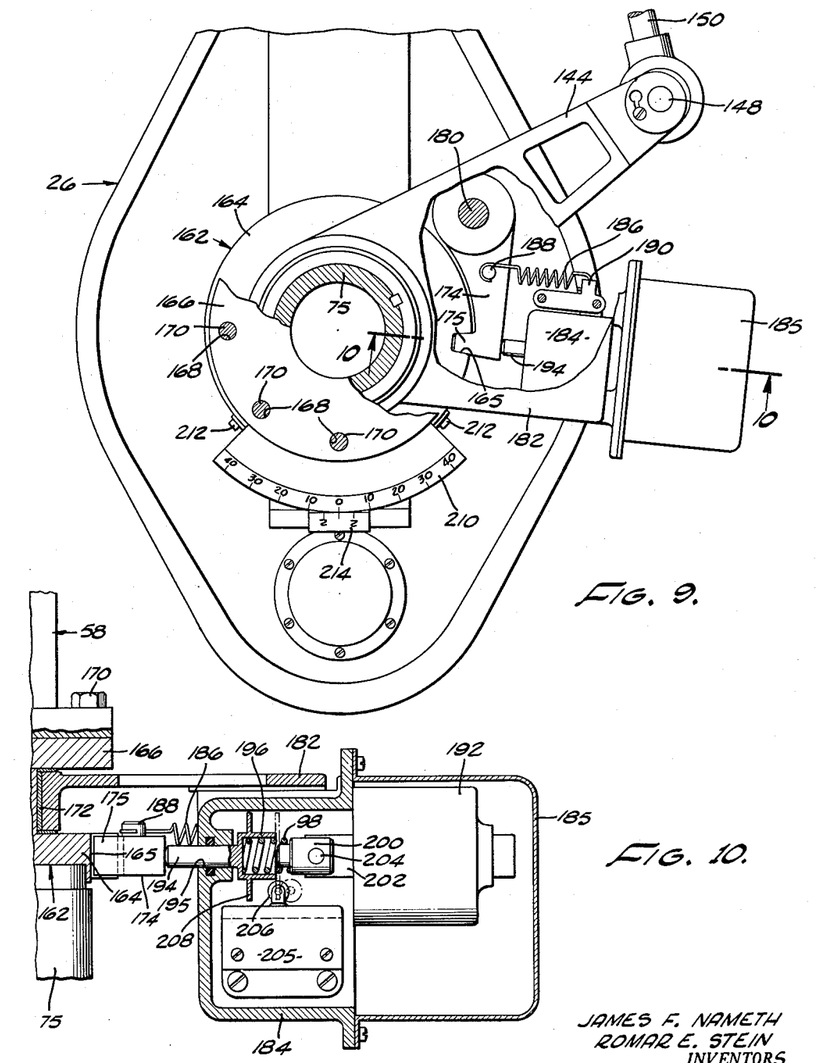
FIG. 9 is a fragmentary plan view, partly broken away, showing a driven crank and an associated clutch for oscillation of the azimuth antenna in precision scanning.
FIG. 10 is a fragmentary sectional view taken as indicated by the line 10—10 of FIG. 9.

As best shown in FIGS. 9 and 10 a collar 162 keyed to the upper end of the tubular shaft 75 has a lower radial flange 164 with a notch 165 therein and has an upper flange 166 with threaded bores 168 therein to receive cap screws 170 for mounting the previously mentioned azimuth antenna yoke 58. The driven rocker arm 144 is mounted on the collar 162 between the two flanges 164 and 166 in a freely rotatable manner with suitable bearing material 172 interposed between the driven rocker arm and the collar. During surveillance scanning by the azimuth antenna the collar 162 rotates continuously with the tubular shaft 75 on which it is mounted and the driven rocker arm 144 is stationary. For precision scanning the driven rocker arm 144 is operatively connected to the tubular shaft 75 by a suitable clutch which in the present construction comprises a dog 174 having a tooth 175 for releasable engagement with the notch 165 of the collar 162.

The clutch dog 174 is pivotally mounted on the driven rocker arm 144 by a suitable pivot means 180 and suitable means is provided to hold the dog in a normal release position and to urge the dog into its engagement position when desired. In the construction shown, a web 182 integral with the driven rocker arm 144 carries a casing 184 having a removable cover 185. A spring 186 is provided to urge the dog 174 towards its retracted position and for this purpose one end of the spring is connected to a pin 188 on the dog and the other end is attached to a bracket 190 on the under side of the web 182. The casing 184 that is carried by the web has a suitable solenoid 192 therein to urge the dog 174 into engagement with the notched collar 162.

As shown in FIG. 10 a plunger 194 for applying pressure to the dog 174 is slidingly mounted in a bore 195 in the casing 184 and has a cup-shaped portion 196 at its inner end to house a suitable coiled spring 198. The coiled spring seats on a second plunger 200 that is dimensioned to enter the cup-shaped portion 196. The second plunger 200 is mounted on a movable armature 202 of the solenoid 192 by cross pin 204.

Normally, with the solenoid 192 deenergized and the plunger 200 on the solenoid retracted, the spring 98 in the cup-shaped portion 196 of the plunger 194 is under relatively light compression, if any, and the spring 186 is effective to hold the dog 174 at its retracted position. When the solenoid 192 is energized, however, the plunger 200 is advanced into the cup-shaped portion 196 of the plunger 194 to compress the spring 98 and as soon as the clutch notch 165 rotates into register with the dog tooth 175 the spring 98 forces the dog tooth into the clutch notch and thereby operatively connects the driven rocker arm 144 with the azimuth antenna. During precision scanning the solenoid 192 remains energized with the various associated components in the positions shown in FIGS. 9 and 10.

A micro-switch 205, hereinafter termed a transfer switch, having an operating member 206 is mounted inside the casing 184 in a position for control by a flange 208 of the plunger 194. In the normal positions of the parts with the spring 186 holding the dog 174 and the plunger 194 in their retracted positions, the flange 208 presses against the operating member 206 to hold the transfer switch in a first open-circuit position with respect to the circuit of the motor 138. When the solenoid 192 is energized to advance the solenoid plunger 200 the transfer switch remains in this first position but moves to its second position as soon as the plunger 194 advances to force the dog into engagement with the clutch notch 165. Since the transfer switch 205 is in the circuit of the motor 138 that operates the drive crank 128, this arrangement automatically times the starting of the motor with the engagement of the solenoid-controlled clutch.

Preferably suitable means is provided for guidance in precision adjustment of the range of throw of the driven rocker arm 144. For this purpose an arcuate scale member 210 (FIG. 9) with suitable indicia thereon may be mounted on the shaft collar 162 by suitable screws 212 and a cooperating index member 214 may be mounted on the support beam 26 adjacent the arcuate scale member.

During surveillance scanning the tubular shaft 75 carrying the azimuth antenna rotates clockwise as indicated by the arrow in FIG. 5 and it is desirable that the initial oscillating movement of the driven rocker arm 144 be in the same clockwise direction to minimize the starting load on the crank-actuating motor 138 as well as to minimize the stress on other working parts. For this reason provision is made for placing the driven rocker arm 144 at a starting position at the rightward limit of its range of oscillation as viewed in FIG. 5. In practice this provision comprises means to insure that a precision scanning operation will always terminate with the driven rocker arm 144 at this desired starting position.

For this purpose a second micro-switch 215 in parallel with the transfer switch 205 in the circuit of the motor 138 is fixedly mounted near the drive shaft 130 for operation by a suitable cam 216 on the drive shaft. This cam opens the micro-switch 215 at the rotary position of the drive shaft 130 corresponding to the desired limit position of the driven rocker arm 144. The previously mentioned automatic brake 139 is normally effective by spring action to immobilize the drive shaft 130 when the motor 138 is deenergized but automatically releases the drive shaft by solenoid action in response to energization of the motor.

In the transition from surveillance scanning operation to precision scanning operation, the surveillance drive motor 80 is first deenergized whereupon the clutch 84 associated therewith automatically releases the tubular shaft 75 to permit continued clockwise rotation of the azimuth antenna. The solenoid 192 is then energized to initiate precision scanning operation by pressing the dog 174 against the rotating collar 162. As soon as the dog tooth 175 enters the clutch notch 165 the transfer switch 205 moves to its second position to close the circuit of the precision scan motor 138, the initial movement of the driven rocker arm 144 being in the same direction as the coasting rotation of the azimuth antenna. The initial movement of the driven rocker arm 144, however, is slower than the coasting rotation of the azimuth antenna with consequent stressing of the parts of the precision scan drive mechanism. Such stressing is minimized by the previously described shock absorber arrangement including the spring 158 and the associated dash-pot.

In the transition from precision scanning operation to surveillance scanning operation, the solenoid 192 is first deenergized whereupon the spring 186 returns the dog 174 and the plunger 194 to their normal positions. The return movement of the plunger 194 returns the transfer switch 205 to its first position to open the circuit of the precision scan motor 138 but the motor continues to be energized by virtue of the parallel micro-switch 215. The cam 216 then opens the micro-switch 215 to deenergize the motor with automatic brake action as soon as the driven rocker arm 144 returns to the desired starting position at the limit of its range of oscillation.

*Means to Create the Required Signals for Delivery to the Indicator Station*

The strobe gate signal, the unblanking signal and the AZ-EL relay signal are generated respectively by three micro-switches 218, 219 and 220 which are actuated by three corresponding cams 221, 222 and 223 on a shaft 224. The shaft 224 is driven by a gear 225 in mesh with a gear 226 on the hollow shaft 75. The shaft 224 also carries a gear 230 in mesh with a gear 232 to drive an auxiliary shaft 234 for actuating a synchro transmitter represented by a broken line rectangle 235. The synchro transmitter 235 has a rotor coil 236 operated by the auxiliary shaft 234 and has a set of three stator coils 238 to produce a synchro signal representing the instantaneous angular position of the auxiliary shaft 234. The gear 230 on the shaft 224 also meshes with a gear 240 on a second auxiliary shaft 242 to actuate a second synchro transmitter represented by a broken line rectangle 244. The synchro transmitter 244 has a rotor coil 245 operatively connected to the auxiliary shaft 242 and has a set of three stator coils 246 to generate a synchro signal corresponding to the instant angular position of the auxiliary shaft 242. The gear 232 is substantially smaller than the gear 230 to increase the range of rotation of the auxiliary shaft 234 relative to the shaft 224. Thus during precision scanning the synchro transmitter 235 oscillates over a wider angle than the azimuth antenna to favor accuracy in the precision signal generated by the stator coils 238. The angular position signal from the stator 238 of the synchro transmitter 235 is delivered to a mixer (not shown) for producing the previously mentioned AZ-EL angle data signal.

The second synchro transmitter 244 is actuated in synchronism with the azimuth antenna and governs the orientation of the surveillance display shown in FIG. 3. Since this orientation must not be affected by changes in rotary position of the support beam 26, the three-wire signal from the synchro transmitter 244 is delivered to the three stator coils 248 of a differential generator that is indicated by the broken line rectangle 250. The differential generator has a three coil rotor 252 that rotates in synchronism with the rotation of the support beam 26. For this purpose the differential generator 250 is carried by the support beam 26 and is operatively connected to a planet gear 254 that is journalled on the support beam. The planet gear 254 meshes with a fixed sun gear 255 at the base of the previously mentioned spindle 50. Thus the three coil rotor 252 of the differential generator 250 develops an angle position signal which is compensated for changes in rotary position of the support beam 26.

A gear 260 mounted on the axis rod member 90 of the framework 88 to oscillate with the elevation antenna E meshes with a pinion 262 to actuate a synchro transmitter 264 and also meshes with a second pinion 265 to actuate a second synchro transmitter 266. The synchro transmitter 264 is utilized to generate an angle position signal during the 7 degree oscillation of the elevation antenna and the synchro transmitter 266 is utilized for the same purpose during the 31 degree oscillation of the elevation antenna. The angle position signals from the two synchro transmitters 264 and 266 are sent selectively to the previously mentioned mixer to produce the AZ-EL angle data signal. A pair of cams 268 and 269 on the axis rod 90 operate a corresponding pair of micro-switches 270 and 271 to generate blanking signals utilized during 7 degree scanning and 31 degree scanning respectively.

A signal to indicate the tilt or angle of inclination of the azimuth antenna relative to its plane of rotation is generated by a suitable potentiometer 275 which is controlled by a pinion 276 in mesh with the previously mentioned driving pinion 74. In like manner the lateral inclination of the elevation antenna relative to its plane of rotation is indicated by a signal from a potentiometer 278 that is controlled by a pinion 280 in mesh with the previously mentioned driving pinion 102.

*System for Remote Control of the Antenna Unit From the Indicator Station*

Figures 11, 12:
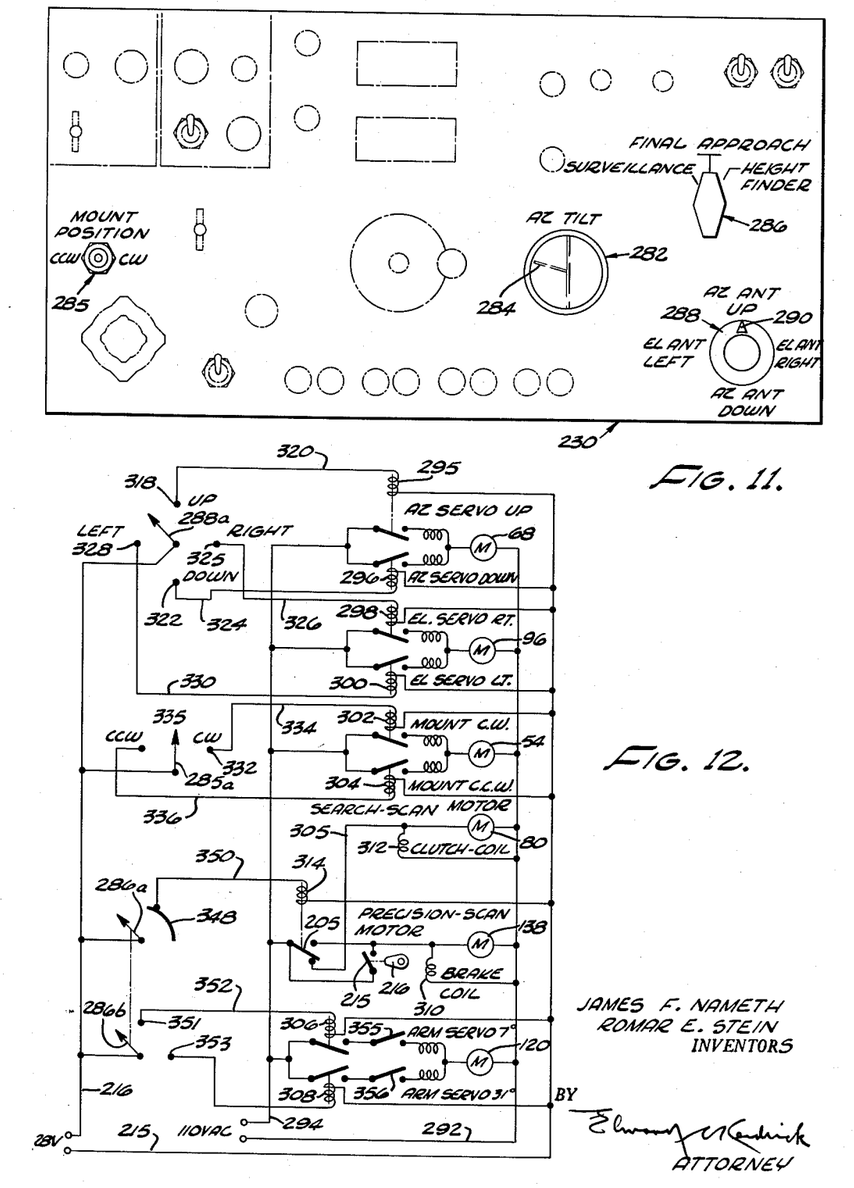
FIG. 11 is a face view of a control panel at the indicator station showing certain components relating to the operation of the antenna unit.
FIG. 12 is a simplified wiring diagram of the system for controlling the operation of the antenna unit.

In the presently preferred practice of the invention it is contemplated that the panel 30 at the indicator station will have numerous indicating and controlling components including the components shown in FIG. 11. The meter 282 has a pointer 284 to indicate the tilt of the azimuth antenna relative to its plane of rotation, this meter being responsive to the previously mentioned potentiometer 275 at the antenna unit. A switch 285 shown in a neutral position in FIG. 11 is movable to a left position to cause counter-clockwise rotation of the supporting beam 26 and is movable to the right to cause clockwise rotation.

A control knob 286 is shown in a central position in FIG. 11 for guidance in the final approach of an aircraft to a landing, this position causing the antenna unit to operate for precision scanning with the elevation antenna oscillating through the smaller 7 degree arc. As indicated in FIG. 11 the control knob 286 may be moved to a rightward position for height finding, the precision scanning operation then being carried out with the elevation antenna oscillating through the wider arc of 31 degrees. At the third leftward position of the control knob 286 indicated in FIG. 11 the antenna unit operates for surveillance scanning with the elevation antenna idle and the azimuth antenna rotating continuously.

A third control knob 288 having a pointer portion 290 is rotatable to four control positions and four alternate neutral positions, the control knob being shown in one of its neutral positions in FIG. 11. When the control knob 288 is turned to its up position the motor 68 at the antenna unit is actuated to tilt the azimuth antenna upward, and when the knob is at its down position the motor is operated in the reverse direction to swing the azimuth antenna downward. In like manner, when the control knob 288 is pointing to the left, the motor 96 at the antenna unit is energized to swing the elevation antenna to the left and when the control knob is turned to its rightward position the motor 96 operates in the opposite direction to swing the elevation antenna to the right.

The required control system may be constructed, for example, in accord with the wiring diagram shown in FIG. 12 in which a switch arm 285a is operated by the knob 285; two switch arms 286a and 286b are operated synchronously by the knob 286; and a switch arm 288a is operated by the control knob 288.

The previously mentioned six motors, 54, 68, 80, 96, 120 and 138 are energized by a pair of leads 292 and 294 from a 110 volt source, the lead 292 being connected directly to one side of each of the six motors. The lead 294 is connected to the oppositely wound field coils of the motor 63 by corresponding relays 295 and 296; the lead is connected to the two oppositely wound field coils of the motor 96 by corresponding relays 298 and 300; the lead is connected to the oppositely wound field coils of the motor 54 by corresponding relays 302 and 304; the lead is connected to the second side of the motor 80 through the previously mentioned transfer switch 205 and a wire 305; the lead is connected to the second side of the motor 138 by the transfer switch 205 and the previously mentioned micro-switch 215; and the lead is connected to the oppositely wound field coils of the motor 120 by two corresponding relays 306 and 308. The diagram shows the micro-switch 215 in parallel with the transfer switch 205, the micro-switch 215 being controlled by the cam 216 as heretofore described.

A coil 310 shown in parallel with the motor 138 is the solenoid coil of the spring-actuated brake 139 and automatically releases the brake whenever the motor 138 is energized. In like manner a coil 312 in parallel with the motor 80 under control of the relay 305 is the actuating coil of the previously mentioned clutch 84, this coil causing the clutch 84 to be engaged whenever the motor 80 is energized.

The coils of the various relays shown in FIG. 12 together with the coil 314 of the previously mentioned solenoid 192 are energized by a pair of leads 215 and 216 from a suitable 28 volt source. The lead 215 is directly connected to one side of each of the relay coils and the solenoid coil 314. The other 28 volt lead 216 is connected directly to each of the four switch arms 285a, 286a, 286b and 288a.

An upper contact 318 associated with the switch arm 288a is connected by a wire 320 with the coil of relay 295; a lower contact 322 is connected by a wire 324 with the coil of relay 296; a right contact 325 is connected by a wire 326 to the coil of relay 298; and a left contact 328 is connected by a wire 330 with the coil of relay 300.

A right contact 332 associated with the switch arm 285a is connected by a wire 334 with the coil of relay 302; and a left contact 335 is connected by a wire 336 with the coil of relay 304. A single arcuate contact 348 cooperative with the switch arm 286a is connected by a wire 350 with the solenoid coil 314. The arcuate extent of the contact 348 corresponds to the range of movement of the control knob 286 between its central position marked "Final Approach" in FIG. 11 and its rightward position marked "Height Finder." An upper contact 351 associated with the switch arm 286b is connected by a wire 352 with the coil of relay 306; and a right contact 353 is connected by a wire 354 with the coil of relay 308.

It is apparent from the diagram how the rotation of the two knobs 285 and 288 and their respective switch arms 285a and 288a serve their purpose in controlling the rotary position of the antenna mount or support beam 26 as well as the inclination of the two antennas relative to their planes of rotation.

When the knob 286 is in its surveillance position the associated switch arms 286a and 286b are in open positions and the transfer switch 205 is in its normal first position to energize the surveillance scan motor 80 and at the same time to hold the clutch 84 in its engaged position by energization of the coil 312.

When the control knob 286 is turned to its central upper position for precision letdown the associated switch arm 286a is positioned at the arcuate contact 348 to energize the solenoid coil 314 and thus cause the transfer switch 205 to take its second position to deenergize the surveillance scan motor 80 and energize the precision scan motor 138. At the same time the associated switch arm 286b is at the contact 351 to energize the coil of relay 306 to operate the motor 120 in the direction to shorten the effective length of the rocker arm 108 to cause the elevation antenna to swing through its smaller 7 degree arc. When the rocker arm 108 is folded to its fully contracted state a limit switch 355 opens the motor circuit. As heretofore described the transfer switch 205 associated with the solenoid coil 314 energizes the motor 138 and the associated brake coil 310 as soon as the previously mentioned clutch dog 174 enters the clutch notch 165.

When the control knob 286 is positioned at its rightward position for height finding, the associated switch arm 286b is at the contact 353 to close the circuit through the coil of relay 308 for energizing the motor 120 in the direction to fully extend the rocker arm 108 for oscillation of the elevation antenna through its larger arc of 31 degrees. A limit switch 356 opens the motor circuit when the rocker arm is fully extended. The switch arm 286a follows the rightward movement of the control knob 286 and during this rightward movement cooperates with the arcuate contact 348 to continue to keep the solenoid 314 energized as required for precision scanning.

Our description of the presently preferred embodiment of the invention by way of example and to illustrate the principles involved will suggest various changes, substitutions and other departures from our disclosure that properly lie within the spirit and scope of the appended claims.

We claim:

1. In a radar system, the combination of: a beam-radiating antenna rotatably mounted on a first axis, a first mechanical driving arrangement for actuating said antenna about said first axis through a large angle in a plane for search scanning; a second mechanical driving arrangement for actuating said antenna about said axis through a smaller angle in said plane for precision scanning; mechanical means for selectively interconnecting said antenna with said first and second mechanical driving arrangement in response to a corresponding electrical control signal; a first control circuit electrically coupled to said mechanical means for producing said control signal effective selectively; and a second control circuit coupled to said mechanical driving arrangements for varying the direction of said precision scanning.

2. A combination as set forth in claim 1 which includes a second beam-radiating antenna rotatable about a second axis perpendicular to said first axis, said second antenna being operatively connected with said second mechanical driving arrangement for actuation thereby in precision scanning, said second antenna being responsive to said second control circuit to scan in the same general direction as said smaller angle.

3. In a radar system, the combination of: beam-deflecting antenna mounted for rotation about an axis; a first mechanical drive means to rotate said antenna continuously in one direction in a plane about said axis for search scanning; a first clutch engageable to operatively connect said first drive means with said antenna; a second mechanical drive means to oscillate said antenna about said axis through a relatively small angle in said plane; a second clutch engageable with said antenna when the antenna is within said small angle to operatively connect said second mechanical drive means with the antenna; and control means movable to a first position to energize said first drive means, engage said first clutch, de-energize said second drive means, and disengage said second clutch, said control means being movable to a second position to de-energize said first drive means, disengage said first clutch, energize said second drive means and engage said second clutch.

4. A combination as set forth in claim 3 which includes: remotely controlled means to operate said second clutch while said antenna is rotating in said one direction; and means to delay engagement of the second clutch with the antenna until the antenna rotates into said small angle.

5. In a radar system, the combination of: a beam-radiating antenna; a first actuating means to rotate said antenna continuously in a given direction about an axis for search scanning; a second oscillating actuating means to oscillate said antenna about said axis through a relatively small angle for precision scanning; control means to make said two actuating means effective selectively; a clutch to operatively connect said second actuating means with said antenna at a predetermined point in the rotation of the antenna; and means to position said actuating means at a starting position at its limit position opposite from said direction whereby the starting oscillatory movement of said second actuating means is in said direction.

6. A combination as set forth in claim 5 in which said positioning means comprises means to stop said oscillating actuating means automatically at said limit position when said second actuating means is made ineffective.

7. A combination as set forth in claim 5 which includes a yielding connection between said second actuating means and said antenna to absorb shock forces involved in initiating the oscillatory movement of the antenna.

8. A combination as set forth in claim 7 which includes a dash-pot to control the rate of recovery of said yielding connection.

9. A combination as set forth in claim 5 in which said second oscillating actuating means is driven by a motor; and in which said motor is controlled by two switches in parallel, one of said switches being responsive to said control means, the other switch being responsive to said second actuating means at said starting position.

10. A combination as set forth in claim 9 which includes a brake to stop said second actuating means in response to de-energization of said motor.

11. In a two-coordinate radar system, the combination of: a support structure mounted for rotation about an orientation axis; a first beam-radiating antenna mounted on said support structure for rotation relative thereto about an axis substantially perpendicular to said orientation axis; a first drive means to rotate said antenna relative to said support structure through a relatively wide range of angles for search scanning; a second beam-radiating antenna mounted on said support structure for rotation relative thereto about a second scanning axis perpendicular to the first scanning axis; a first rocker means for connection with said first antenna for oscillation thereof through a relatively small angle in said range of angles for precision scanning; a second rocker means operatively connected with said second antenna for oscillation thereof in a plane extending in the same general direction as said small angle for precision scanning; a drive crank operatively connected to said two rocker means for concurrent oscillation of the two antennas for precision scanning; the axes of rotation of said two rocker means and said crank being substantially parallel with said first and second rocker means positioned substantially 90° apart relative to the drive crank axis to cause the two antennas to oscillate at substantially 90° out of phase with each other; a second drive means to rotate said drive crank; a first clutch to operatively connect said first drive means with said first antenna; a second clutch to operatively connect said first rocker means with said first antenna; and control means for operating said drive means and clutch means selectively; and means to rotate said support structure to vary the general direction of said small angle.

12. A combination as set forth in claim 11 in which said control means is movable to a first position to operate said first drive means and a second position to operate said second drive means, said first clutch being engageable in response to movement of said control means to said first position and said second clutch means being engageable in response to movement of said control means to said second position.

13. In a two-coordinate radar system wherein first and second beam-radiating antennas are rotatable about first and second axes for scanning in respective planes, means for oscillating said antennas comprising: first rocker means to oscillate said first antenna through a relatively small angle; second rocker means to oscillate said second antenna through an angle extending in the same general direction as said relatively small angle; a drive crank linked to said first and second rocker means for actuation thereof; and an arm operatively connected with said second rocker means for oscillation thereby, said arm being variable in effective length and being operatively connected with said second antenna for oscillation thereof in response to oscillation of said second rocker means; and remotely controlled means to vary the effective length of said arm thereby to vary the range of oscillation of said second antenna.

14. An antenna system for a combined precision approach and search radar comprising elevation and azimuth antennas rotatable in mutually perpendicular planes, a precision approach motor, rotary-to-oscillatory coupling means between said precision approach motor and said antennas, an air surveillance motor, rotary coupling means between said air surveillance motor and said azimuth antenna, and means for selectively connecting said azimuth antenna to said rotary-to-oscillatory coupling means and to said rotary coupling means.

15. In a radar system having first and second antennas which may scan first and second intersecting sectors, apparatus comprising, a source of motive power, first coupling means selectively connectible between said source of motive power and said antennas whereby scanning of said first and second sectors may be effected, second coupling means selectively connectible between said source of motive power and said second antenna whereby scanning of a continuous circular sector may be effected, and means associated with said first and second coupling means whereby connection of one of said coupling means effects disconnection of the other.

16. In a radar system having at least first and second antennas rotatable about axes which lie in respective intersecting planes, apparatus comprising, a source of motive power, first coupling means selectively connectible between said source of motive power and said antennas whereby oscillating motion may be imparted to said antennas about their respective axes, second coupling means selectively connectible between said source of motive power and said second antenna whereby continuous rotary motion may be imparted to the latter, means associated with said first and second coupling means whereby connection of one of said coupling means effects disconnection of the other, a source of high frequency energy, means for alternately energizing said antennas when said first coupling means are connected, and means responsive to the connection of said second coupling means for energizing said second antenna alone with high frequency energy.

17. In a radar system having elevation and azimuth antennas rotatable about axes which lie in respective intersecting planes, apparatus comprising, a source of rotative power, rotary-to-oscillatory coupling means selectively connectible between said source of rotative power and said antennas whereby oscillating motion may be imparted to said antennas about their respective axes, rotary coupling means selectively connectible between said source of rotative power and said azimuth antenna whereby continuous rotary motion may be imparted to the latter, means associated with said rotary-to-oscillatory and said rotary coupling means whereby connection of one of said coupling means effects disconnection of the other, and a servo system for aligning said azimuth antenna with respect to said rotary-to-oscillatory coupling means when the latter coupling means are selected for connection.

18. Apparatus as in claim 17 wherein said rotary coupling means includes a clutch and said means associated with said rotary-to-oscillatory and said rotary coupling means is a linkage which disengages and engages said clutch in response to said rotary-to-oscillatory coupling means being connected and disconnected respectively.

19. In a radar system selectively operable for either a precision approach or air surveillance radar, apparatus comprising, elevation and azimuth antennas rotatable in mutually perpendicular planes, a precision approach motor, rotary-to-oscillatory coupling means connectible between said precision approach motor and said antennas, an air surveillance motor, rotary coupling means connectible between said search motor and said azimuth antenna, elevation and azimuth antenna feedhorns, an input waveguide, waveguide coupling means including a waveguide switch between said input waveguide and said feedhorns, mechanical switch coupling means connectible between said precision approach motor and said waveguide switch, and means for selectively connecting either both said antennas to said rotary-to-oscillatory coupling means and said microwave switch to said mechanical switch coupling means, or connecting said azimuth antenna to said rotary coupling means with said mechanical coupling means disconnected from said microwave switch, said switch then being positioned whereby microwave energy incident to said input waveguide may be coupled to said azimuth feedhorn.

20. In a combined precision approach and search radar system, apparatus comprising, elevation and azimuth antennas rotatable about mutually perpendicular axes, search and precision approach motors, rotary-to-oscillatory coupling means connectible between said precision approach motor and said antennas, rotary coupling means connectible between said search motor and said azimuth antenna, means for changing from precision approach operation to search operation including means for disconnecting said rotary-to-oscillatory coupling means from said elevation antenna, means for deenergizing said precision approach motor, means for energizing said search motor, means for connecting said rotary coupling means between said search motor and said azimuth antenna, means for changing from search operation to precision approach operation including means for disconnecting said azimuth antenna from said rotary coupling means when said azimuth antenna bears a predetermined relation to said rotary-to-oscillatory coupling means while connecting said latter coupling means to said azimuth antenna, and means for energizing said precision approach motor.

21. In a combined precision approach and air surveillance radar system having elevation and azimuth antennas rotatable in mutually perpendicular planes, apparatus comprising precision approach and air surveillance motors, elevation and azimuth spindles secured to the respective antennas, a gear box connected to said precision approach motor, a spindle crank connectible by a slidable locking pin to a gear secured to said azimuth spindle, a pair of rotary-to-oscillatory linkages for respectively coupling said spindle crank and said elevation spindle to said gear box, a waveguide switch mechanically coupled to said gear box, a clutch which when engaged effects mechanical coupling between said air surveillance motor and said azimuth spindle, and a linkage between said locking pin and said clutch whereby said locking pin in a first position effects mechanical coupling between said spindle crank and said azimuth spindle and said clutch is disengaged, and in a second position disconnects mechanical coupling between said crank and azimuth spindle and said clutch is engaged.

22. In a radar system having elevation and azimuth antennas, apparatus comprising, a source of motive power, means for selectively coupling said source of motive power to said antennas to effect the search of intersecting sectors thereby, a radar transmitter receiver, a radio frequency switch for alternately coupling said antennas to said radar transmitter receiver, elevation and azimuth resolvers coupled to said elevation and azimuth antennas respectively for deriving positional data signals characteristic of the sector position then scanned, means for selectively coupling said source of motive power to said azimuth antenna whereby the latter is effective in searching a continuous circular sector, a search resolver coupled to said azimuth antenna for deriving a positional data signal characteristic of the portion of said circular sector then scanned, means for positioning said radio frequency switch whereby said azimuth antenna is energized while searching said continuous circular sector, a radar indicator coupled to said radar transmitter receiver, and means for coupling said search, azimuth, and elevation resolvers to said radar indicator.

23. In a radar system having first and second antennas rotatable about axes which lie in first and second intersecting planes respectively, apparatus comprising, a source of motive power, coupling means between said source of motive power and said antennas whereby oscillatory motion may be imparted to the antennas about their respective axes, second coupling means selectively connectible between said source of motive power and said azimuth antenna whereby continuous rotary motion about its axis may be imparted to the latter, a source of high frequency energy, a radio frequency switch for alternately coupling said source of high frequency energy to said antennas when said first coupling means is connected and exclusively to said azimuth antenna when said second coupling means are connected.

24. In a radar system having first and second antennas rotatable about axes which lie in respective intersecting planes, apparatus comprising, a source of motive power, first coupling means selectively connectible between said source of motive power and at least one of said antennas whereby oscillating motion may be imparted to said antennas about their respective axes, second coupling means selectively connectible between said source of motive power and said second antenna whereby continuous rotary motion may be imparted to the latter, and means associated with said first and second coupling means whereby connection of one of said coupling means effects disconnection of the other.

25. In a radar system, the combination of: beam deflecting antenna mounted for rotation about an axis; a first mechanical drive means to rotate said antenna continuously in one direction in a plane about said axis for search scanning; a first clutch engageable to operatively connect said first drive means with said antenna; a second mechanical drive means to oscillate said antenna about said axis through a relatively small angle in said plane; a second clutch engageable with said antenna when the antenna is within said small angle to operatively connect said second actuating means with said antenna; and control means movable to a first position to energize said first drive means, engage said first clutch, de-energize said second drive means, and disengage said second clutch, said control means being movable to a second position to de-energize said first drive means, disengage said first clutch, energize said second drive means and engage said second clutch.

26. A multiple purpose radar system for detecting the position of aircraft from the ground, said system comprising: an azimuth antenna having a beam relatively narrow in azimuth and an elevation antenna having a beam relatively narrow in elevation; first means actuable to cause rotation of said azimuth antenna beam throughout a relatively large angle in azimuth; second means actuable to cause oscillation of said azimuth antenna beam throughout a relatively small angle in azimuth; and third means actuable to oscillate said elevation antenna beam throughout a relatively small angle in elevation synchronously with oscillation of said azimuth antenna beam in a manner such that said beams alternately scan approximately the same predetermined space; fourth means to energize said azimuth antenna when said first means is actuated; fifth means to de-energize said elevation antenna when said first means is actuated; sixth means to energize both of said antennas alternately when the beam of each corresponding antenna is scanning said predetermined space; seventh means to indicate the outputs of said antennas; and eighth means for deactuating said first and fourth means and actuating said second, third and sixth means.

27. A multiple purpose radar system for detecting the position of aircraft from the ground, said system comprising: an azimuth antenna having a beam relatively narrow in azimuth and an elevation antenna having a beam relatively narrow in elevation; first means actuable to cause rotation of said azimuth antenna beam throughout a relatively large angle in azimuth more than 360°; second means actuable to cause oscillation of said azimuth antenna beam throughout a relatively small angle in azimuth less than 360°; and third means actuable to oscillate said elevation antenna beam throughout a relatively small angle in elevation less than 360° synchronously with oscillation of said azimuth antenna beam in a manner such that said beams alternately scan approximately the same predetermined space; fourth means to energize said azimuth antenna when said first means is actuated; fifth means to de-energize said elevation antenna when said first means is actuated; sixth means to energize both of said antennas alternately when the beam of each corresponding antenna is scanning said predetermined space; seventh means to indicate the outputs of said antennas; and eighth means for deactuating said first and fourth means and actuating said second, third and sixth means.

References Cited in the file of this patent
UNITED STATES PATENTS

| | | |
|---|---|---|
| 1,918,180 | Carter | July 11, 1933 |
| 2,555,101 | Alvarez | May 29, 1951 |
| 2,557,967 | Hudson et al. | June 26, 1951 |
| 2,586,827 | Karlson | Feb. 26, 1952 |

UNITED STATES PATENT OFFICE
CERTIFICATE OF CORRECTION

Patent No. 3,026,517                                  March 20, 1962

James F. Nameth et al.

It is hereby certified that error appears in the above numbered patent requiring correction and that the said Letters Patent should read as corrected below.

In the drawings, FIG. 10, for the reference numeral "98" read -- 198 --; FIG. 12, for the reference numeral "215" read -- 315 --; same FIG. 12, for the reference numeral "216" read -- 316 --; column 8, lines 5, 11, and 13, for "98", each occurrence, read -- 198 --; column 11, line 28, for "215" read -- 315 --; line 29, for "216" read -- 316 --; same line 29, for "215" read -- 315 --; line 31, for "216" read -- 316 --.

Signed and sealed this 10th day of July 1962.

(SEAL)
Attest:

ERNEST W. SWIDER                                  DAVID L. LADD
Attesting Officer                                        Commissioner of Patents